(12) United States Patent
Karpinsky et al.

(10) Patent No.: US 10,011,426 B1
(45) Date of Patent: Jul. 3, 2018

(54) CONVEYOR SYSTEMS WITH ALIGNMENT OF CONVEYED PRODUCTS

(71) Applicant: Vibratory Solutions, LLC, Lodi, WI (US)

(72) Inventors: Jim Karpinsky, Madison, WI (US); Jim Bakos, Puyallup, WA (US); Adam Smith, Baraboo, WI (US); Scott Rose, Columbus, WI (US)

(73) Assignee: Vibratory Solutions, LLC, Lodi, WI (US)

( * ) Notice: Subject to any disclaimer, the term of this patent is extended or adjusted under 35 U.S.C. 154(b) by 0 days.

(21) Appl. No.: 15/410,956

(22) Filed: Jan. 20, 2017

Related U.S. Application Data

(60) Provisional application No. 62/281,817, filed on Jan. 22, 2016.

(51) Int. Cl.
 *B65G 47/30* (2006.01)
 *B65G 15/10* (2006.01)
 *B65G 17/12* (2006.01)
 *B65G 47/78* (2006.01)
 *B65G 47/88* (2006.01)

(52) U.S. Cl.
 CPC ........... *B65G 15/105* (2013.01); *B65G 17/12* (2013.01); *B65G 47/78* (2013.01); *B65G 47/8892* (2013.01)

(58) Field of Classification Search
 CPC .... B65G 47/082; B65G 47/08; B65G 15/105; B65G 19/34; B65B 35/44
 USPC ................................................. 198/418–433
 See application file for complete search history.

(56) References Cited

U.S. PATENT DOCUMENTS

| | | |
|---|---|---|
| 2,775,268 A | 12/1956 | Eckart |
| 3,166,175 A | 1/1965 | Kurtz et al. |
| 3,245,518 A | 4/1966 | Reibel et al. |
| 3,263,592 A | 8/1966 | Hickey et al. |
| 3,547,075 A | 12/1970 | Johnson |
| 3,648,596 A | 3/1972 | Zito |
| 3,640,767 A | 9/1972 | Fulton et al. |
| 3,762,363 A | 10/1973 | Johnson |
| 3,809,132 A | 5/1974 | Jones |
| 3,869,972 A | 3/1975 | Chase |
| 3,948,493 A | 4/1976 | Moser et al. |
| 4,058,083 A | 11/1977 | Miller |
| 4,214,548 A | 7/1980 | Booth et al. |
| 4,633,652 A * | 1/1987 | Dagenais ................ B65B 19/34 53/148 |
| 4,777,056 A | 10/1988 | Buhler et al. |
| 5,067,431 A | 11/1991 | Heitiller |
| 5,238,303 A | 8/1993 | Dixon |

(Continued)

FOREIGN PATENT DOCUMENTS

| | | |
|---|---|---|
| CA | 2697897 A1 | 2/2011 |
| GB | 2209006 | 4/1989 |
| JP | 410263521 | 10/1998 |

*Primary Examiner* — William R Harp
(74) *Attorney, Agent, or Firm* — Craig A. Fieschko, Esq.; DeWitt Ross & Stevens S.C.

(57) ABSTRACT

A conveyor system includes a product distribution conveyor which spreads products across its width and aligns them in uniform orientations while doing so; a lateral transfer conveyor which receives a row of the aligned products from the product distribution conveyor, and rejects unaligned and/or excess products while doing so; and a product loading conveyor which receives each row of products and loads them into packaging in a neatly aligned array.

20 Claims, 6 Drawing Sheets

(56) References Cited

U.S. PATENT DOCUMENTS

| | | |
|---|---|---|
| 5,437,723 A | 8/1995 | Sollich |
| 5,512,008 A | 4/1996 | Musschoot |
| 5,937,744 A | 8/1999 | Nothum, Sr. et al. |
| 6,343,688 B1 | 2/2002 | McKinley |
| 6,505,547 B1 | 1/2003 | Burnett et al. |
| 6,510,809 B2 | 1/2003 | Kuenen |
| 7,174,846 B2 | 2/2007 | Zeegers et al. |
| 7,654,381 B2 * | 2/2010 | Webb .................... B65G 15/58 198/419.3 |
| 7,703,411 B1 | 4/2010 | Bakos et al. |
| 7,757,836 B2 | 7/2010 | Karpinsky et al. |
| 8,181,592 B2 | 5/2012 | Karpinsky et al. |
| 8,359,995 B2 | 1/2013 | Bakos et al. |
| 8,708,132 B2 * | 4/2014 | Kelly ..................... B65B 35/44 198/418 |
| 8,813,946 B2 * | 8/2014 | Webb ................... B65G 47/082 198/419.3 |
| 9,277,754 B2 | 3/2016 | Karpinsky et al. |
| 9,309,061 B2 * | 4/2016 | Kelly ..................... B65B 35/44 |
| 9,382,025 B2 * | 7/2016 | De Vries ................ B65B 35/56 |
| 9,463,935 B1 | 10/2016 | Karpinsky et al. |
| 9,499,352 B2 * | 11/2016 | Le Paih ............... B65G 47/082 |
| 2002/0175051 A1 | 11/2002 | Samson |
| 2008/0283366 A1 | 11/2008 | Karpinsky et al. |
| 2009/0007842 A1 | 1/2009 | Stacy et al. |
| 2011/0097459 A1 | 4/2011 | Bakos et al. |
| 2012/0244264 A1 | 9/2012 | Karpinsky et al. |

\* cited by examiner

CONVEYOR SYSTEMS WITH ALIGNMENT OF CONVEYED PRODUCTS

CROSS-REFERENCE TO RELATED APPLICATIONS

This application claims priority under 35 USC § 119(e) to U.S. Provisional Patent Application 62/281,817 filed 22 Jan. 2016, the entirety of which is incorporated by reference herein.

FIELD OF THE INVENTION

This document concerns an invention relating generally to product conveyor systems, and more specifically to conveyor systems which transport and organize products, particularly food products, for packaging or other processing.

BACKGROUND OF THE INVENTION

Automated and semi-automated product manufacturing systems often utilize conveyors to transport completed (or semi-completed) product for packaging, or for further processing and completion. Belted conveyor systems—that is, conveyor systems using endless belts, chains, or other flexible loops—are well known. Vibratory conveyor systems, which transport product across a vibrating pan (one or more platforms or other surfaces across which product is vibratorily conveyed), are less commonly used but can be ideal for some applications. Such vibratory conveyor systems typically utilize a relatively lightweight product transport pan, often mounted in a surrounding frame, with the pan or frame being resiliently mounted to a relatively heavy shaker base, (for example, by leaf or beam springs). The shaker base is oscillated at relatively high frequency (e.g., at 5-100 Hz), and at low amplitude. As the vibration is transmitted to the product transport pan, product essentially "bounces" across the pan in accordance with any inclination of the pan, and/or in accordance with the direction of oscillation imparted to the pan. Examples of vibratory conveyor systems of this nature can be found in U.S. Pat. No. 9,463,935 to Karpinsky et al. (which is particularly recommended for further background relevant to the present invention), as well as U.S. Patent Appl'n. Publ'n. 2011/0097459 to Bakos et al.; U.S. Pat. No. 9,277,754 to Karpinsky et al.; U.S. Pat. No. 8,359,995 to Bakos et al.; U.S. Pat. No. 8,181,592 to Karpinsky et al.; U.S. Pat. No. 7,703,411 to Bakos et al.; and U.S. Pat. No. 7,757,836 to Karpinsky et al., as well as the patents cited in (and patents citing to) these references, all of which are incorporated by reference herein such that their contents should be regarded as a part of this document.

Both belted and vibratory conveyor systems can involve challenges with obtaining proper positioning of product traveling on the systems, particularly where a conveyor system is intended to provide product to a packaging system: it is often desirable to situate product so that all products have the same orientation, and/or so that they are aligned in an ordered array, for ease of packaging or other further processing. For example, a fill-and-seal packaging system may provide packaging trays or "webs" having multiple compartments or other areas into which product is to be deposited in a particular orientation so that the packaging can thereafter be properly sealed with the product inside. Guides, pushers, or other structures can be situated along a conveyor system to help move product into a desired position, but such product positioning systems tend to be imperfect, and require at least some degree of "dressing" along or at the end of the conveyor system (i.e., some degree of manual repositioning of "rogue" products which do not have the desired location, orientation, and/or alignment). There is an ongoing need for conveyor systems which achieve desired product positioning with minimal need for dressing, while at the same time minimizing the machinery needed for product repositioning (and its cost and maintenance burdens), and while also minimizing product handling and wear. These concerns can be particularly critical where the product being transported is a food product, as such products tend to be fragile and require sanitary processing.

SUMMARY OF THE INVENTION

The invention involves conveyor systems and methods which are intended to at least partially alleviate the aforementioned problems. To give the reader a basic understanding of some of the advantageous features of the invention, following is a brief summary of an exemplary version of the invention, with reference being made to the accompanying drawings (which are briefly reviewed in the following "Brief Description of the Drawings" section of this document) to assist the reader's understanding. Since the following discussion is merely a summary, it should be understood that more details regarding the invention are provided in the Detailed Description set forth elsewhere in this document. The claims set forth at the end of this document then define the various features of the invention in which exclusive rights are secured.

Figure 1A:
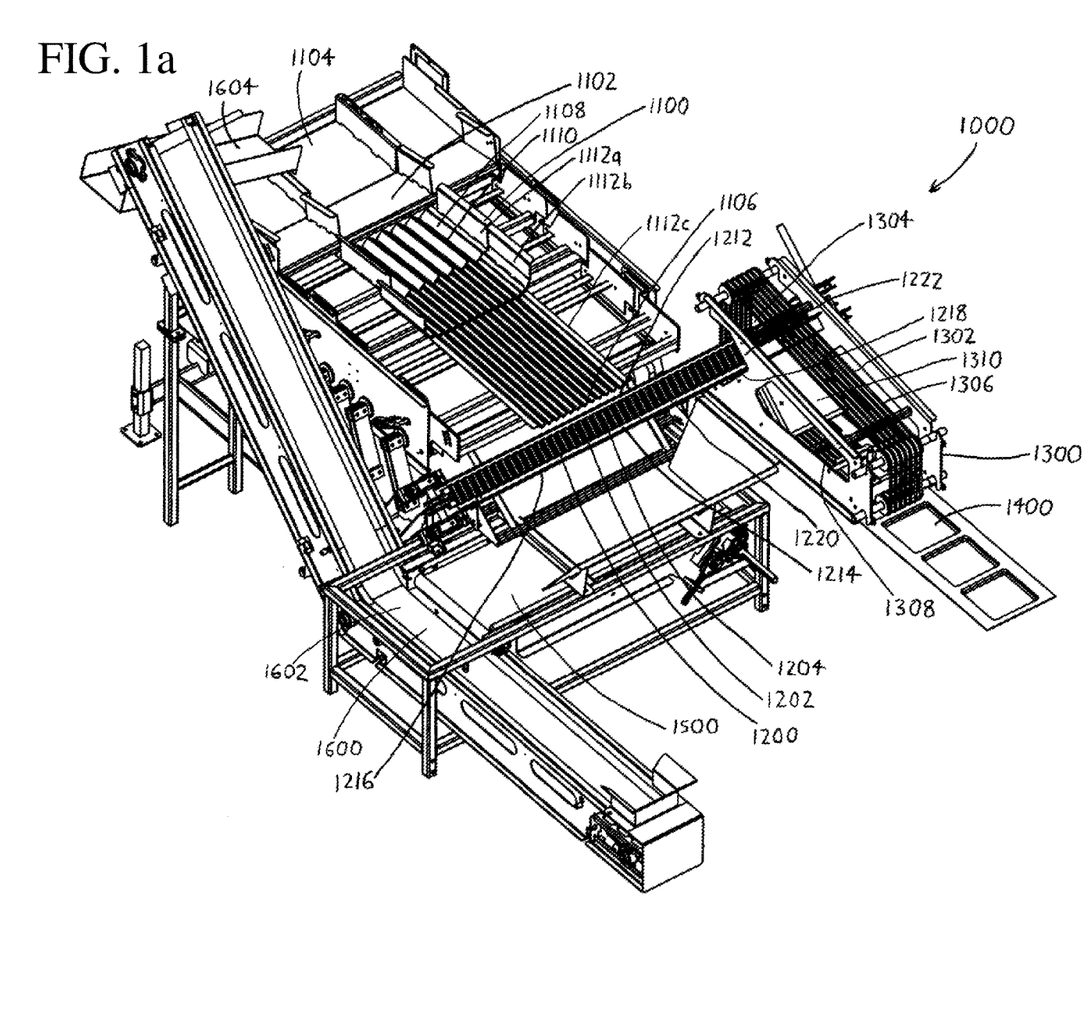
FIG. 1*a* is a perspective view of an exemplary conveyor system 1000 which incorporates features of the invention.

FIG. 1a illustrates an exemplary conveyor system 1000 which is particularly useful for conveyance and orderly grouping of elongated foodstuffs known in the trade as "stick" (longer and skinny) and "dog" (shorter and fatter) products, such as sausages, corn dogs, taquitos/flautas, burritos, eggrolls, meat sticks, jerky strips, and the like. However, it may be used (or may be adapted to be used) with other types of product. The conveyor system 1000 is depicted with:

a product distribution conveyor 1100 (here a vibratory conveyor) having a product travel path 1102 along which products travel from a product distribution conveyor input end 1104 to a product distribution conveyor output end 1106;

a flighted lateral transfer conveyor 1200 which receives products from the product distribution conveyor 1100, and moves in a direction lateral to the product travel path 1102 of the product distribution conveyor 1100;

a product loading conveyor 1300 having continuous product loading belts 1302 (shown in the form of cords) which collectively encircle a product loading area 1304 into which the lateral transfer conveyor 1200 extends, each product loading belt 1302 having opposing upper and lower product loading belt lengths 1306 and 1308 with the lower product loading belt lengths 1308 being adjacently spaced in a parallel array, with the product loading conveyor 1300 receiving products from the lateral transfer conveyor 1200 such that each product lands between (and on the edges of) a pair of the lower product loading belt lengths 1308;

a packaging line conveyor 1400, which receives the products from the product loading conveyor 1300;

a first recycling conveyor 1500 situated beneath the lateral transfer conveyor 1200, the first recycling conveyor 1500 being configured to receive products that may fall from the lateral transfer conveyor 1200; and a second recycling conveyor 1600 which receives the fallen products from the first recycling conveyor 1500, and deposits them back on the product distribution conveyor input end 1104.

Each of these components will now be discussed in turn in greater detail with reference to FIGS. 1a-1b. Note that in these drawings, some motors, shakers/vibrators, and other actuators for driving various components have been omitted for sake of clarity and simplicity, but inventors and others of ordinary skill in the field of conveyor system design should readily recognize how to accomplish installation of suitable actuators.

The product distribution conveyor 1100—which is here a vibratory conveyor, though it could be another type of conveyor (e.g., a belted conveyor)—receives product at its product distribution conveyor input end 1104, e.g., from another conveyor (not shown), and distributes the product across discrete product travel lanes 1108 arrayed laterally across the product travel path 1102 of the product distribution conveyor 1100. The product travel lanes 1108 are each situated between adjacent dividers 1110, with the dividers 1110 being spaced laterally across the product travel path 1102 and extending between the product distribution conveyor input end 1104 and the product distribution conveyor output end 1106. The product distribution conveyor 1100 is shown as having multiple tiers 1112a, 1112b, and 1112c, with successive tiers having twice the number of product travel lanes 1108 as the prior tier, and having dividers 1110 aligned with the product travel lanes 1108 of the prior tier. Owing to this arrangement, as products fall from tier to tier, they tend to laterally spread across the width of the product distribution conveyor 1100. Additionally, while the products are typically deposited at the product distribution conveyor input end 1104 in random orientations, as they fall from tier to tier, they tend to move into alignment with the product travel lanes 1108 (i.e., the lengths of the products rest parallel with the product travel lanes 1108). Thus, products at the product distribution conveyor output end 1106 are typically relatively evenly distributed across the width of the final tier 1112c of the product distribution conveyor 1100, and they are also typically uniformly aligned, with their lengths being parallel to the product travel lanes 1108. However, some unaligned "rogue" products will occasionally occur, and will be fed to the lateral transfer conveyor 1200 along with the aligned products.

The lateral transfer conveyor 1200 includes a continuous lateral transfer belt 1202 (shown as a chain belt) having an upper lateral transfer belt length 1204 and an opposing lower transfer belt length (not visible in the drawings), with the belt 1202 having flights 1208 (see FIG. 1b) protruding therefrom, and with valleys 1210 defined between the flights 1208. The valleys 1210 have valley lengths extending between a lateral transfer conveyor lengthwise input end 1212 and an opposing lateral transfer conveyor lengthwise output end 1214 situated lower than the lateral transfer conveyor lengthwise input end 1212 (i.e., the valley lengths slope downwardly between the lengthwise input and output ends 1212 and 1214). The lateral transfer belt 1202 rotates such that the upper lateral transfer belt length 1204 laterally translates from a lateral transfer conveyor lateral input end 1216 beneath the product distribution conveyor output end 1106 to a lateral transfer conveyor lateral output end 1218 situated within the product loading area 1304 of the product loading conveyor 1300 (see FIG. 1b for a detailed view wherein portions of the housing of the product loading conveyor 1300 shown in FIG. 1a are removed). At least a subset of the valleys 1210 defined along the upper lateral transfer belt length 1204 are unobstructed at the lateral transfer conveyor lengthwise input end 1212, whereby (aligned) products may be received into respective valleys 1210 of the subset as they fall from the product distribution conveyor output end 1106 toward the lateral transfer conveyor lengthwise input end 1212, and into the valleys 1210. A stop 1220, shown as a stationary wall having a height no greater than that of the valleys 1210, is situated along a portion of the lateral transfer conveyor lengthwise output end 1214, and outside the product loading area 1304 along the lateral transfer conveyor lateral input end 1216, at the upper lateral transfer belt length 1204. This stop 1220 obstructs the valleys 1210, whereby products falling into the downwardly-sloping valleys 1210 from the product distribution conveyor output end 1106 are deterred from exiting the lateral transfer conveyor 1200 along its lateral input end and its lengthwise output end 1214. At the same time, the lack of the stop 1220 within the product loading area 1304 of the product loading conveyor 1300 allows the valleys 1210 in the product loading area 1304 to release their products.

During operation, rotation of the lateral transfer belt 1202 is occasionally stopped such that a subset of the valleys 1210 has each valley therein situated in alignment with an adjacent product travel lane 1108 of the product distribution conveyor 1100, whereby (aligned) products in the product travel lanes 1108 may be received within the valleys 1210 of the subset. The valleys 1210 are configured/sized to each be substantially filled by any product falling therein. The lateral transfer belt 1202 is stopped for a sufficiently long time that all of the valleys 1210 within the subset are likely to be filled with products from the product distribution conveyor 1100, though empty valleys 1210 may occasionally occur. At the same time, owing to the downward slope of the lateral transfer belt 1202, "rogue" products which are unaligned with the valley lengths, and/or which fall atop already-filled valleys 1210, slide downwardly atop the flights 1208 of the upper lateral transfer belt length 1204. Provided the stop 1220 has a height no greater than that of the valleys 1210, the "rogue" products then fall from the lateral transfer conveyor lengthwise output end 1214 to be caught by the first recycling conveyor 1500 for recycling (as discussed below). A stationary barricade 1222 (FIG. 1a) may also be situated closely above the flights 1208 of the lateral transfer belt 1202 outside the lateral transfer conveyor lateral input end 1216, whereby a "rogue" product which fails to fall from the upper transfer belt length will encounter the barricade 1222, and be swept from the lateral transfer belt 1202, as the upper lateral transfer belt length 1204 translates toward the product loading area 1304 of the product loading conveyor 1300.

At the lateral transfer conveyor lateral output end 1218, the lateral transfer belt 1202 is situated within the product loading area 1304 of the product loading conveyor 1300 such that when rotation of the belt 1202 is stopped, a subset of the valleys 1210 has each valley therein situated in alignment with the space between a pair of lower product loading belt lengths 1308, whereby products falling from the valleys 1210 each land between, and on the edges of, a pair of the lower product loading belt lengths 1308 (which are preferably oriented in planes parallel to the valley lengths of the lateral transfer belt 1202). The products thus each ride on and between a pair of adjacent product loading belts 1302 near the rear of the product loading conveyor 1300. Placement of the products on the lower product loading belt lengths 1308 may be assisted by a product guide 1310 situated within the product loading area 1304 between the lateral transfer conveyor 1200 and the product loading conveyor 1300. Referring to FIG. 1*b*, the product guide 1310 has chutes 1312 (passages or valleys) defined therein, with the chutes 1312 being oriented to receive a product from one of the valleys 1210 of the lateral transfer belt 1202, and direct the product onto a pair of the lower product loading belt lengths 1308. To prevent products from immediately falling into the chutes 1312 once they clear the stop 1220 at the lateral transfer conveyor lengthwise output end 1214 (with the stop 1220 terminating at the product guide 1310), one or more chute gates 1314 are preferably situated within or adjacent the chutes 1312 (only one being shown), with the chute gates 1314 being movable to selectively obstruct or clear the chutes 1312, and thereby selectively block or pass the products' passage through the chutes 1312. Thus, the lateral transfer conveyor 1200 may index a set of products along the stop 1220, and into the product loading area 1304 and along the chute gate 1314, to halt when the products' valleys 1210 (and thus the products) are aligned with the chutes 1312 of the product guide 1310. The chute gate 1314 may then be actuated to clear the chutes 1312, allowing the products to drop through the chutes 1312 and onto the lower lengths 1308 of the product loading belts 1302.

The product loading belts 1302—which are preferably cord-like and flexible, with an elliptical (oval or preferably circular) cross-section—are constantly rotated to carry any products thereon forwardly. A stop gate 1316—which is optional—is situated within the product loading area 1304 forwardly of the lateral transfer conveyor 1200 and the product guide 1310, and is movable between a lower stop gate position situated on or closely adjacent to the lower product loading belt lengths 1308, and an upper stop gate position spaced further from the lower product loading belt lengths 1308 than the lower stop gate position. Thus, the stop gate 1316, when present and in the lower stop gate position, restrains products riding on the lower product loading belt lengths 1308, and resting against the stop gate 1316, from moving with the product loading belts 1302. One or more rows of products, with each product within each row bridging adjacent product loading belts 1302, may therefore accumulate behind the stop gate 1316 when it is in the lower stop gate position. When a full row of products is accumulated behind the stop gate 1316 (as detected by photosensors or other sensors, not shown), the stop gate 1316 may lift to the upper stop gate position so that the products can ride forwardly on the product loading belts 1302 until they encounter a barrier 1318, which is preferably situated forwardly of the stop gate 1316 by a distance approximately equal to the length of each product. A product pusher 1320, which acts similarly to a ram or a press, is situated within the product loading area 1304 above the product loading belts 1302, and forwardly of the stop gate 1316 and behind the barrier 1318. The product pusher 1320 has a lower pusher surface movable (not visible in the drawings) toward the lower product loading belt lengths 1308, whereby products situated on the product loading belts 1302 behind the barrier 1318 may be urged by the lower pusher surface through the flexible product loading belts 1302 to fall therefrom. (And if the stop gate 1316 is not provided, the product pusher 1320 may be activated once a full row of products is sensed behind the barrier 1318.) The products may be caught within packaging (e.g., trays) situated on the packaging line conveyor 1400 below, with the products being neatly aligned within a row. The filled packaging which may then be indexed forwardly on the packaging line conveyor 1400 for subsequent processing (e.g., sealing).

As noted above, the first recycling conveyor 1500 is situated beneath the lateral transfer conveyor 1200 to receive "rogue" products falling therefrom. The first recycling conveyor 1500 is depicted as a vibrating conveyor (though as with the product distribution conveyor 1100, a different type of conveyor may be used), and it slopes toward an input end 1602 of the second recycling conveyor 1600. The fallen "rogue" products are therefore vibrated onto the input end 1602 of the (belted) second recycling conveyor 1600, which carries the products upwardly to a slide 1604 that deposits them back on the product distribution conveyor input end 1104. The "rogue" products are then again vibrated through the product distribution conveyor 1100, and provided they align to be received within valleys 1210 of the lateral transfer conveyor 1200, they will be transferred to the product loading conveyor 1300, and into packaging on the packaging line conveyor 1400. However, any products which fail to fall within valleys 1210 will be recycled until such time they are received within valleys 1210. Beneficially, irregular/misshapen products which cannot fit into valleys 1210 will also be rejected for recycling before they reach the product loading conveyor 1300; these products can then be manually or otherwise removed from the recycling circuit. The invention therefore provides a degree of product quality control, as well as neatly arraying products for packaging.

Further features and advantages of the invention will be apparent from the remainder of this document in conjunction with the associated drawings.

DETAILED DESCRIPTION OF EXEMPLARY VERSIONS OF THE INVENTION

Figure 1B:
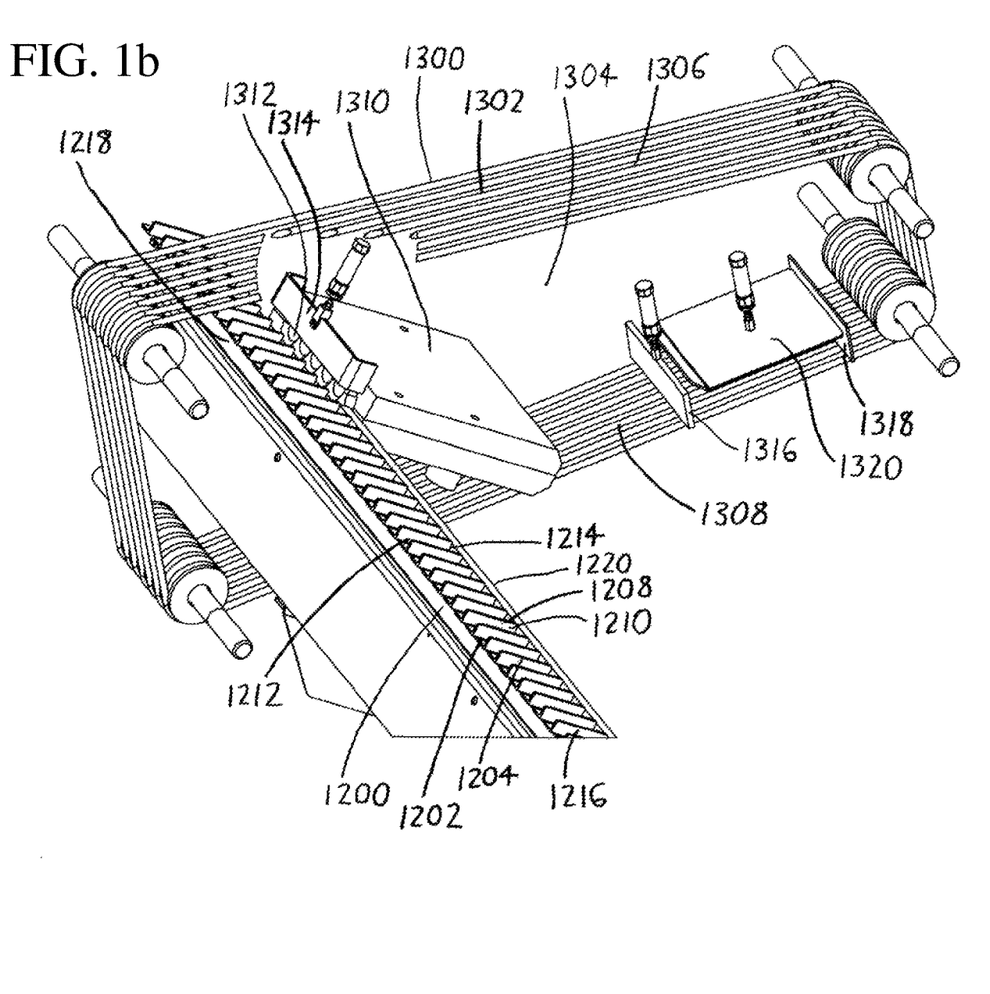
FIG. 1*b* is a detailed perspective view of portions of the lateral transfer conveyor 1200 and product loading conveyor 1300 of the conveyor system 1000 of FIG. 1*a*, shown with portions of the product loading belts 1302 cut away for clearer viewing of the product loading guide 1310 and its chute gate 1314.

As a first exemplary version of the invention was briefly described in the foregoing Summary of the Invention with reference to FIGS. 1*a*-1*b*, the following discussion will focus on an alternative version generally identified in FIGS. 2*a*-2*d* as conveyor system 2000. It should be understood that concepts discussed with respect to the conveyor system 1000 typically extend to the conveyor system 2000, and vice versa.

Figure 2A:
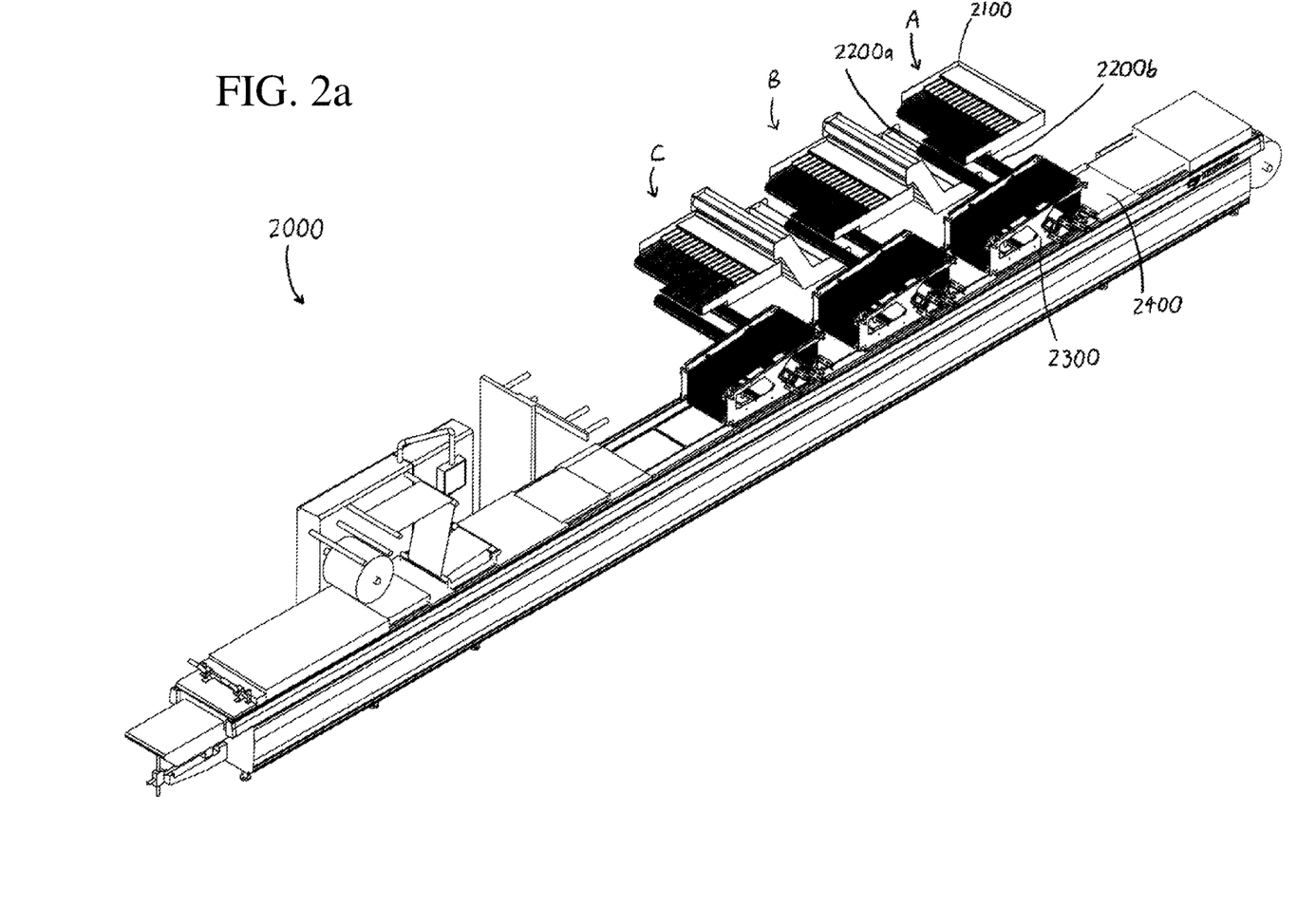
FIG. 2*a* is a perspective view of another exemplary conveyor system 2000 which incorporates features of the invention.

As an overview, looking to FIG. 2*a*, the conveyor system 2000 includes a "form-fill-seal" packaging line 2400 having a conveyor which forms and conveys trays, pocketed webs, or other packages to be filled with products, and then sealed. (Neither the products nor the packages are depicted in the drawings.) Three identical conveyor subsystems A, B, and C are shown, each having a product distribution conveyor 2100 adjacent the packaging line conveyor 2400; lateral transfer conveyors 2200*a* and 2200*b* extending laterally between the product distribution conveyor 2100 and the packaging line conveyor 2400; and a product loading conveyor 2300 situated over the packaging line conveyor 2400. The product distribution conveyors 2100 receive products to be packaged in the packages, with the products being received in random orientations, and orient the products into uniform orientations (more specifically, into parallel relation). The oriented products in each product distribution conveyor 2100 are then loaded into the lateral transfer conveyors 2200*a* and 2200*b*, which convey the oriented products to the product loading conveyor 2300. The product loading conveyors 2300 then dispense the oriented products into the packages on the packaging line conveyor 2400 for subsequent sealing. The illustrated arrangement is primarily intended to have each conveyor subsystem A, B, and C fill its own package on the packaging line conveyor 2400, with the conveyor then indexing the filled packages beneath and past any subsequent conveyor systems for subsequent sealing; for example, a package filled by conveyor subsystem A will be indexed past conveyor subsystems B and C once filled.

In FIG. 2*a*, the packaging line conveyor 2400 is of the type which takes a plastic web and heat-forms product pockets therein for receiving products, and after product is received in the pockets, a plastic top sheet is heat-welded over the top of the web to close the pockets. The entire web is then indexed through a cutter that cuts the web into product packages having the desired number of sealed pockets. However, the packaging line conveyor 2400 is not regarded to be a key aspect of the invention, and a wide variety of alternative packaging line conveyors can be used instead. The invention may be used with any packaging line conveyor 2400 wherein products are to be deposited into packaging in one or more regular arrays, such as where one array of eight parallel adjacent sausages is to be deposited into a packaging pocket; where two adjacent spaced arrays, each containing six taquitos or eggrolls, are to be deposited into two adjacent packaging pockets; and so forth.

Figure 2B:
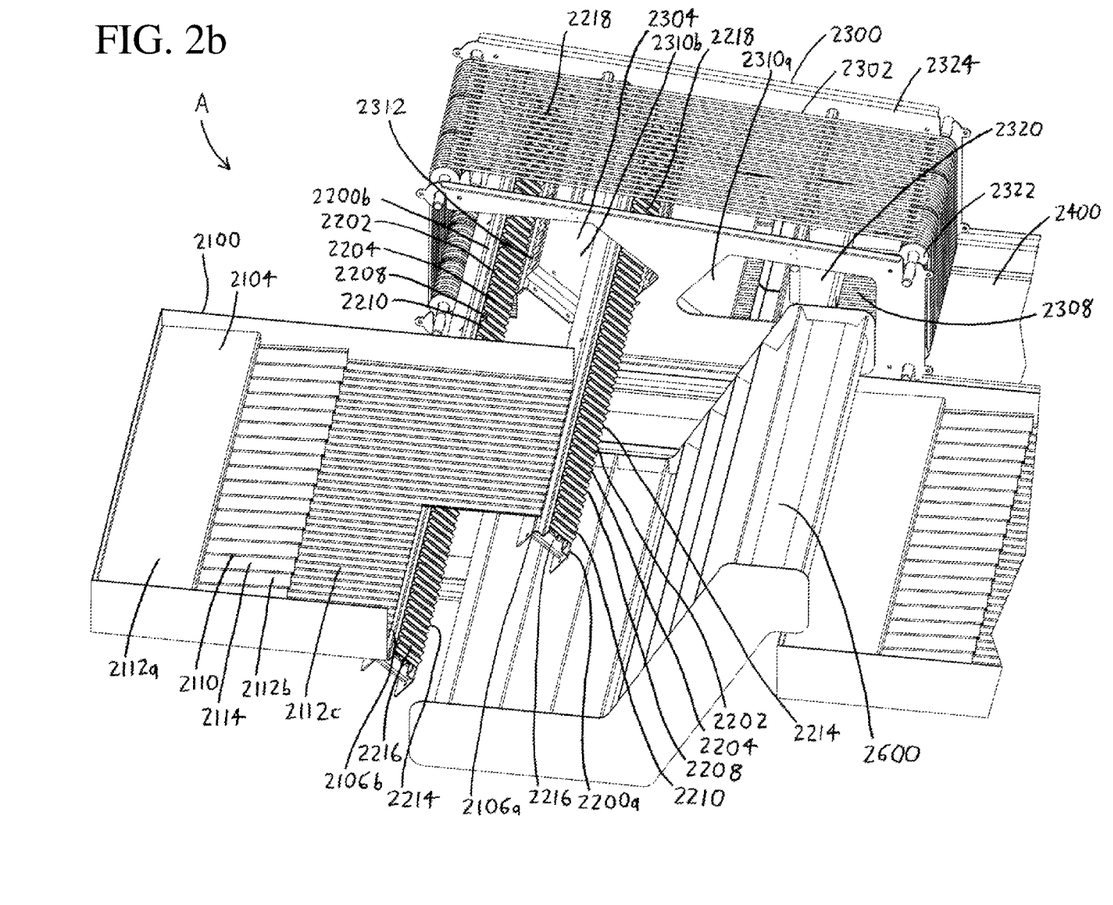
FIG. 2*b* is a more detailed perspective view of the conveyor subsystem A of the conveyor system 2000 of FIG. 2*a*.

Looking particularly at the conveyor subsystem A, shown in detail in FIG. 2*b* (and which is identical to conveyor subsystems B and C of FIG. 2*a*), the product distribution conveyor 2100 is laterally spaced from the packaging line conveyor 2400, and uses the lateral transfer conveyors 2200*a* and 2200*b* to provide the products to the packaging line conveyor 2400 via the product loading conveyor 2300. This spaced arrangement eases cleaning and maintenance of the packaging line conveyor 2400, the product distribution conveyor 2100, and the other noted assemblies. The product distribution conveyor 2100 operates in generally the same manner as the product distribution conveyor 1100 discussed above: products in a variety of orientations are provided (by unshown conveyors or other means) to a product distribution conveyor input end 2104 onto a smooth upper distribution tier 2112*a* of a product distribution conveyor 2100, and moves (via vibration of the product distribution conveyor 2100) to an intermediate distribution tier 2112*b* bearing dividers 2110, where products begin to fall into the troughs 2114 between the dividers 2110. The products are then further vibrated into a lower distribution pan 2112*c* having a greater number of dividers 2110 (preferably twice as many), where disarrayed products are further oriented into parallel alignment within the troughs 2114. Some of the troughs 2114 of the lower distribution pan 2112*c* (preferably half of them) have greater length than the other half, with the longer troughs 2114 being on the left side of the lower distribution pan 2112*c* (when one looks down the product distribution conveyor 2100 from its input end 2104), and the shorter troughs 2114 being on the right side of the lower distribution pan 2112*c*. The longer troughs 2114 provide their products from a product distribution conveyor input end 2106*a* to a shorter forward lateral transfer conveyor 2200*a*, and the shorter troughs 2114 provide their products from a product distribution conveyor input end 2106*b* to a longer rear lateral transfer conveyor 2200*b*.

Figure 2C:
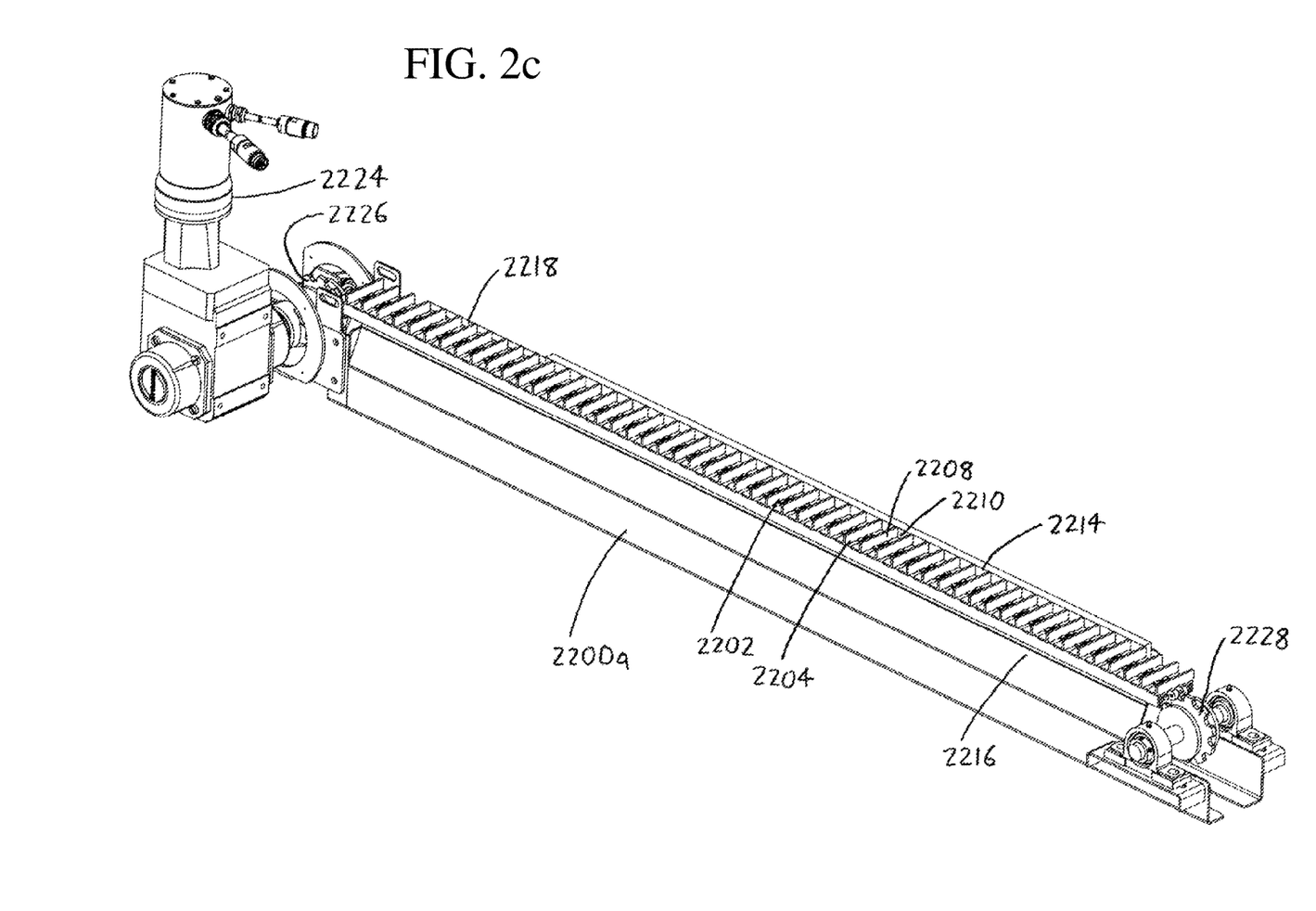
FIG. 2*c* is a perspective view of the lateral transfer conveyor 2200*a* of the conveyor subsystem A of FIGS. 2*a*-2*b*, shown with portions of its lateral transfer belt 2202 removed so that only the upper lateral transfer belt length 2204 is visible, and shown with its drive motor 2224 (which is omitted from FIGS. 2*a*-2*b*).

To better illustrate the concept of the lateral transfer conveyors 2200*a* and 2200*b*, the forward lateral transfer conveyor 2200*a* is shown in FIG. 2*c* with portions of its lateral transfer belt 2202 removed so that only the upper lateral transfer belt length 2204 of the of the lateral transfer belt 2202 is visible. The lateral transfer conveyor 2200*a* is also shown with its drive motor 2224 (which is omitted from FIGS. 2*a*-2*b*) adjacent its lateral transfer conveyor lateral output end 2218, with the drive motor 2224 being operable to rotate a drive gear 2226 to drive a chain (not visible) of the lateral transfer belt 2202. This (unshown) chain bears the flights 2208 between which the product-bearing valleys 2210 are defined. A sprocket 2228 at the lateral transfer conveyor lateral input end 2216 supports the opposite end of the lateral transfer belt 2202. (Again, the ends of the lateral transfer belt 2202 about the drive motor 2224 and sprocket 2226 are removed so that only the upper lateral transfer belt length 2204 is visible.) The flights 2208 have roughly the same spacing as the troughs 2214 in the lower distribution pan 2112*c* of the product distribution conveyor 2100 supplying the lateral transfer conveyor 2200*a*, with this spacing being at least the same as, and preferably slightly greater than, the width/diameter of each product to be packaged. The flights 2208 preferably have heights which are at least the same as, and preferably slightly less than, the width/diameter of each product to be packaged. Thus, products from the lower distribution pan 2112*c* of the product distribution conveyor 2100 will preferably closely fill the valleys 2210. The motor 2224 is preferably a servomotor or other appropriate actuator operable to halt motion of the lateral transfer belt 2202 and precisely align the flights 2208 with the dividers 2110 of the lower distribution pan 2112*c* of the product distribution conveyor 2100, so that products between the dividers 2110 will be vibrated into the valleys 2210. The lateral transfer conveyor 2200*a* is preferably mounted slightly lower than, and with a slight downward incline with respect to, the lower distribution pan 2112*c* of the product distribution conveyor 2100, such that products vibrating down the lower distribution pan 2112*c* will tip off of the end of the lower distribution pan 2112*c*, and "downhill" into the valleys 2210 of the lateral transfer belt 2202. The products will continue to slide forwardly in the valleys 2210 until they encounter a stop (not shown in the drawings), which is preferably formed as a barrier extending adjacent the lower ends of the flights 2208 at the lateral transfer conveyor lengthwise output end 2214. The stop preferably has roughly the same height as the flights 2208, and extends laterally to the product guide 2310*a* (FIG. 2*b*) within the product loading area 2304 of the product loading conveyor 2300. The stop prevents the products from falling from the valleys 2210, including when the lateral transfer conveyor 2200a is periodically actuated to laterally transfer products to the product loading conveyor 2300. If any excess products are fed from the lower distribution pan 2112c of the product distribution conveyor 2100—for example, if a product is fed to an already-filled valley 2210—the excess product slides over the top of the product already situated in the valley 2210. The same occurs with any products that were not oriented as desired by the product distribution conveyor 2100, and which are presented to the lateral transfer conveyor 2200a as unaligned "rogue" products.

Returning to FIG. 2b, each lateral transfer conveyor 2200a and 2200b indexes at regular intervals to move products loaded into its valleys 2210 to a respective product guide 2310a and 2310b within the product loading conveyor 2300. The movement of each lateral transfer conveyor 2200a and 2200b can be controlled using a timer, and/or via feedback from photoelectric or other sensors that monitor for the filling of the valleys 2210. To better ensure that "rogue" products (i.e., products which are not orderly situated within valleys 2210) are not carried to the product loading conveyor 2300, a gate (bar, blade, or other obstruction, not shown in the drawings) may extend parallel to, and just above, the flights 2208 of each lateral transfer conveyor 2200a and 2200b at the location where the lateral transfer conveyor enters the product loading area 1304 of the product loading conveyor 1300. This optional gate can therefore sweep rogue products from its lateral transfer conveyor 2200a or 2200b as the conveyor indexes products toward the product loading conveyor 2300.

The lateral transfer conveyor 2200a and 2200b can be lengthened as desired if additional space is desired between the product distribution conveyor 2100 and the product loading conveyor 2300, e.g., to facilitate access to the sides of the product distribution conveyor 2100 and/or the product loading conveyor 2300 for cleaning or maintenance, and/or for inspection of products within the valleys 2210, and/or for operator insertion of products into the valleys 2210 if valleys 2210 are left unfilled.

Products from the product distribution conveyor 2100 that fail to enter a valley 2210, or which are "rogue" and gets swept from a lateral transfer conveyor 2200a or 2200b by a gate, will fall from the lateral transfer conveyors 2200a and 2200b and can be treated in a number of ways. It can be caught by bins resting beneath the lateral transfer conveyors, or by a conveyor which collects products dropped from all of the lateral transfer conveyors of the conveyor subsystems A, B, and C of FIG. 2a and then feeds the products to a single bin. The products in the bin(s) can periodically be emptied back onto the upper distribution tier(s) 2112a of one or more of the product distribution conveyors 2100, and/or can be used to "dress" packages on the packaging line conveyor 2400 (i.e., to fill any unfilled space left in a package). Alternatively, a recycling system may automatically carry products fallen from one or more of the lateral transfer conveyors 2200 back to the upper distribution tier(s) 2112a of one or more of the product distribution conveyors 2100. An arrangement of this nature is shown in FIGS. 2a-2b, wherein flighted recycling conveyors 2600 are situated beneath the lateral transfer conveyors 2200 of the conveyor systems A and B, with each carrying fallen products to the product distribution conveyor 2100 of the subsequent conveyor system. Fallen products from the lateral transfer conveyor 2200 of the conveyor system C simply lands on a surface for later collection, and for placement back into some desired point(s) of the packaging process. Other recycling systems, such as those using concepts of the patents referenced in the Background of the Invention section of this document, are also possible.

Figure 2D:
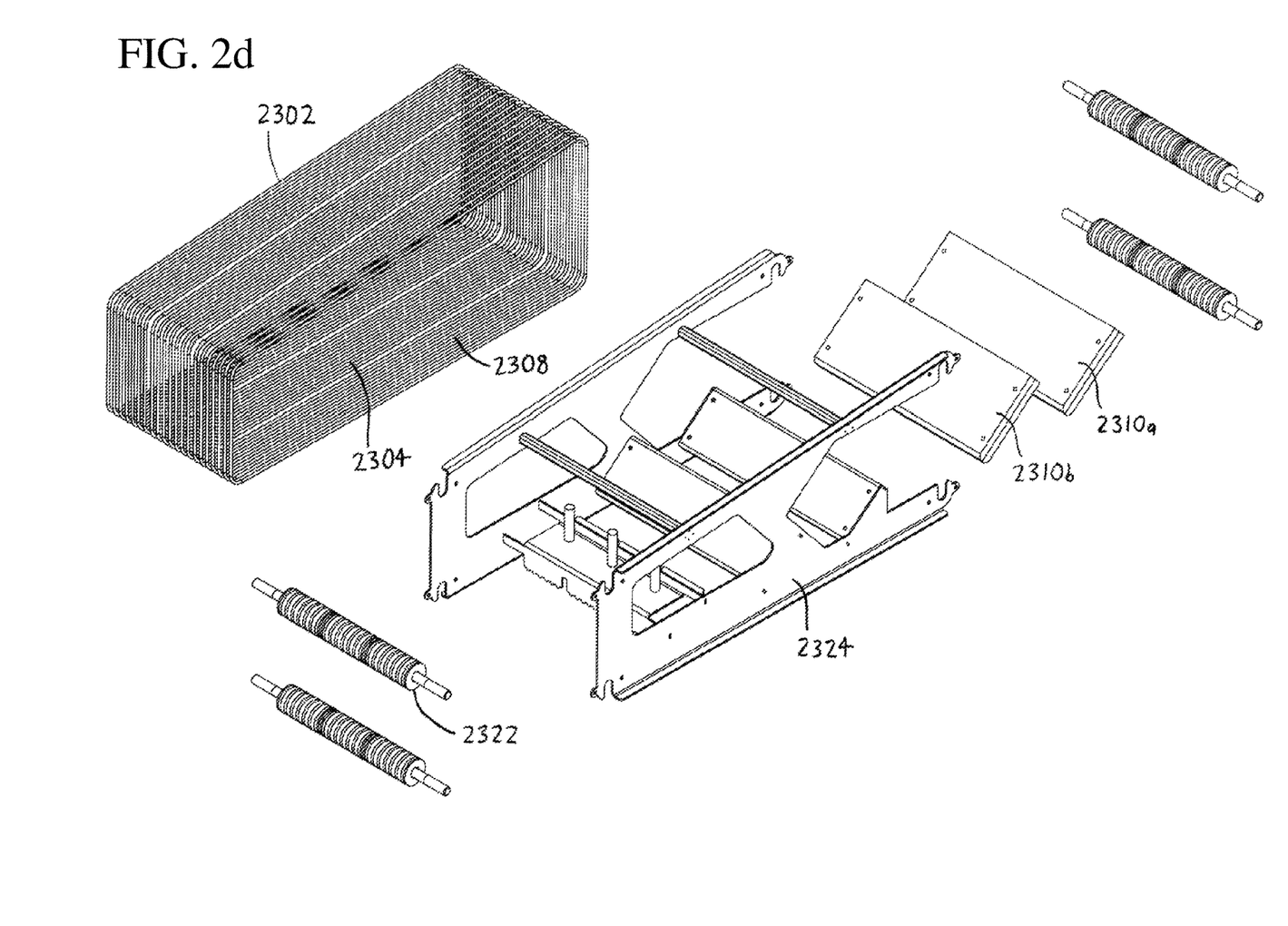
FIG. 2*d* is an "exploded" (disassembled) perspective view of portions of the product loading conveyor 2300 of the conveyor subsystem A of FIGS. 2*a*-2*b*.

Referring again to FIG. 2b, products properly seated within the valleys 2210 will travel from the lateral transfer conveyors 2200a and 2200b to the product loading conveyor 2300 for loading into packages. Preferably, the product loading conveyor 2300 further aligns the products, stages them over the packaging line conveyor 2400, and then inserts the products into packages on the packaging line conveyor 2400. FIG. 2d depicts the product loading conveyor 2300 of FIG. 2b in disassembled form, showing its product loading belts 2302, the rollers 2322 that rotatably bear the belts 2302, and the frame 2324 that bears the rollers 2322. The product loading conveyor frame 2324 is preferably formed of stainless steel sheet metal with open sides to ease installation of the lateral transfer conveyors 2200a and 2200b, and to facilitate cleaning and observation of the packaging process. The rollers 2322 are mounted on bearings near the corners of the frame 2324, with three of the rollers 2322 being idler rollers, and one of the rollers 2322 being driven by a gearbox and motor (not shown) or other suitable actuator. The rollers 2322 have glands machined into their faces to accept the product loading belts 2302, which are preferably formed of flexible but largely inelastic cords, e.g., urethane cords. As discussed in greater detail below, the lateral transfer conveyors 2200a and 2200b provide products to the inner circumferences of the product loading belts 2302 at their lower product loading belt lengths 2308 (preferably via a product guide 2310a/2310b, discussed below) such that each product rides on (and between) a pair of the parallel spaced belts 2302. The product loading belts 2302, as depicted in FIG. 2b, travel in a counterclockwise direction such that the lower product loading belt lengths 2308 move forwardly. The products then ride forwardly (i.e., to the right in FIG. 2b) on the parallel spaced belts 2302 to a desired location above packaging situated on the packaging line conveyor 2400 beneath the product loading conveyor 2300. A product pusher 2320 then descends to push the products through the belts 2302 and into the packaging. The spacing and properties of the product loading belts 2302 must be such that adjacent belts 2302 can support opposing sides of a product, while at the same time allowing the belts 2302 to flex outwardly when the product is pushed between the belts 2302. Additionally, the belts 2302 must be situated and spaced such that when the product is pushed between the belts 2302, the product falls into the desired location within the packaging below. Thus, the rollers 2322 have their glands formed such that the belts 2302 are located to properly situate products with respect to the pockets or other features in the packaging below the belts 2302. In some applications, two adjacent belts 2302 are needed per each lane of products to support the products and/or provide the proper product placement with respect to the packaging below. In other applications, the products and their desired placement may be such that each product can be supported by adjacent belts 2302 with a common belt 2302 being shared between two lanes of product. While not shown in FIG. 2d, it can be useful to provide each belt 2302 with its own individual weighted roller 2322, with all rollers 2322 mounted on rocker arms (which may be spring-loaded), so that the belts 2302 remain consistently tensioned. One or more roller shafts may also or alternatively be provided with a takeup or other device allowing displacement of the roller shafts to allow adjustment of the tensioning of the belts 2302, with examples of such devices being shown in U.S. Pat. Nos. 5,259,821; 5,054,608; 5,030,173; 4,803,804; and 3,832,910.

As noted above, products are preferably transferred in FIG. 2*b* from the lateral transfer conveyors 2200*a* and 2200*b* to the product loading belts 2302 via product guide 2310*a* and 2310*b*, which are perhaps best seen in FIG. 2*b* as thick plate-like structures situated beneath the lateral transfer conveyors 2200*a* and 2200*b* within the product loading area 1304 encircled by the product loading belts 2302. Each product guide 2310*a* and 2310*b* has a series of chutes 2312 opening onto its upper edge, with these chutes 2312 extending to the lower edge. The product guides 2310*a* and 2310*b* are preferably formed as two halves, each having channels extending between its opposing upper and lower edges, such that when the halves are joined, the chutes 2312 are defined between the opposing upper and lower edges of the product guides 2310*a* and 2310*b*. At the upper edge of each product guide 2310*a* and 2310*b*, the chutes 2312 are spaced and situated to each receive a product from one of the valleys 2210 of the lateral transfer conveyors 2200*a* and 2200*b*. At the lower edge of each product guide 2310*a* and 2310*b*, the chutes 2312 are spaced and situated to place each product between adjacent product loading belts 2302. In some cases, the chutes 2312 may converge or diverge as they extend between the upper and lower edges of each product guide 2310*a* and 2310*b*, thereby adapting the product spacing from that of the lateral transfer conveyors 2200*a* and 2200*b* to that desired for placement on the belts 2302. The number of chutes 2312 in each product guide 2310*a* and 2310*b* preferably corresponds to the number of products to be dispensed onto the packaging.

The product guides 2310*a* and 2310*b* are preferably mounted at the same angle as the valleys 2210 such that they smoothly accept products from the valleys 2210. At the upper edge of each product guide 2310*a* and 2310*b*, the chutes 2312 can diverge as they open onto the upper edge so as to define wide-mouthed "funnels" for receiving products, thereby better ensuring that the products readily fall into the chutes 2312. Also at the upper edges of the product guides 2310*a* and 2310*b*, each product guide may have a pneumatically, electromechanically, or otherwise actuated chute gate (not shown) that would maintain products within the valleys 2210 of the lateral transfer conveyor 2200*a* and 2200*b* as they translate over the upper edges of the product guides 2310*a* and 2310*b*. Once each lateral transfer conveyor 2200*a* and 2200*b* stops over a product guide 2310*a* and 2310*b*, the chute gate associated with its adjacent product guide is retracted out of the way to allow the products to fall into the product guides' chutes 2312, which guide the products downwardly onto the product loading belts 2302.

Once products are received on the product loading belts 2302 (with each product straddling two adjacent belts), the belts 2302 are driven forwardly until they hit a stop gate (not shown, but resembling the stop gate 1316 of FIG. 1*b*) positioned slightly above the belts 2302, but situated sufficiently close to the belts 2302 to engage the leading edges of the products as they travel forwardly on the belts 2302. This stop gate can be retracted when photoelectric or other sensors, and/or one or more timers, detect that all lanes (i.e., all belt pairs which are intended to carry products) are carrying products situated against the stop gate. The belts 2302 may continue to run constantly (or intermittently) as a row of products accumulates against the stop gate. When a full row of products is detected and the stop gate retracts, the belts carry the row of products forward until the products encounter a final fixed barrier (also not shown, but resembling the stop gate 1318 of FIG. 1*b*) which can be adjustable to halt the row of products at the row's final desired position (above the location desired for product placement on the packaging beneath). Preferably, a "timeout" feature is also incorporated wherein failure to detect a full row of products for some extended period of time will activate an alert (signaling that there may be problems in one or more lanes), and will also (or alternatively) lift the stop gate to allow the products to move forward. A downstream operator may then "dress" the filled packaging to account for any missing products or other issues.

As seen in FIG. 2*b*, a product pusher 2320—shown without its actuators, and in its lowered position—can be driven downwardly between the stop gate and the barrier to push the products from and between its supporting product loading belts 2302, and onto the packaging below. The product pusher 2320 may simply take the form of a horizontal beam which is driven downwardly (and upwardly) by pneumatic cylinders, linkage or cam mechanisms, or other actuators. The flexibility of the product loading belts 2302 is such that they provide good support for the products, while at the same time deflecting as the products are pushed between the belts 2302 to fall onto the packaging.

The arrangement shown in FIGS. 2*a*-2*b*, wherein half of the products on each product distribution conveyor 2100 is provided to a lateral transfer conveyor 2200*a* and the other half is provided to a lateral transfer conveyor 2200*b*, with each lateral transfer conveyor 2200*a* and 2200*b* supplying a respective product guide 2310*a* and 2310*b* within a product loading conveyor 2300, allows two rows of products to be situated on the product loading belts 2302 with one row situated rearwardly of a front row. The chute gate of the forward product guide 2310*a* could release its row of products first, and the chute gate of the rear product guide 2310*b* can release its row of products behind the front row. This better ensures that the first row of products is indexed forwardly before the next row is released, deterring product overlap/overfeed. The front row of products is carried forwardly on the product loading belts 2302 until it encounters the stop gate located behind the product pusher 2320, and is held there by the stop gate with the belts moving beneath the front row and carrying the second row of products into abutment with the front row. The stop gate can then be retracted and both rows can move forwardly until the front row encounters the barrier, and the stop gate can then be lowered behind the rear row. Both rows may then be pushed through the product loading belts 2302 simultaneously by the product pusher 2320 to be received by the packaging. Alternatively, only one of the lateral transfer conveyors 2200*a* and 2200*b*, and only one of the product guides 2310*a* and 2310*b*, could be provided if only a single row of products was to be received by a pocket in the packaging. Conversely, additional lateral transfer conveyors and product guides might be used if multiple rows of product were desired.

If stacked products were desired in the packaging, after a first layer of products is pushed into pockets on the web on the packaging line conveyor 2400, the conveyor 2400 could hold the web in place until the product loading conveyor(s) accumulates and pushes a subsequent layer of products into the same pocket(s) as the prior layer of products. Or, in an arrangement such as that shown in FIG. 2*a*, wherein multiple conveyor subsystems A, B, and C are used, the rearmost conveyor system A can dispense one layer of products, with the conveyor 2400 then indexing the web forwardly to have subsequent layers applied by the subsequent conveyor subsystems B and C.

The arrangements shown in the drawings, and the foregoing discussion, assume that "stick" or "dog"-type products are to be packaged. However, the invention can also accommodate round or patty type products. Here the product distribution conveyor 2100 can have its dividers 2110 and troughs 2114 configured to align the round/patty product to rest on its face, and the lateral transfer conveyors 2200a and 2200b can have their flights 2208 spaced to have the valleys 2210 accommodate the product widths/diameters. Much of the product loading conveyor 2300 could be removed, but the product guides 2310a and 2310b could remain in modified form, with elongated slots 2312 configured to closely receive the cross-sections of the products (as opposed to the cylindrical bores used to pass stick/dog products). The product guides 2310a and 2310b could then directly feed the products into pockets formed in the web on the packaging line conveyor 2400. As an alternative, the lateral transfer conveyors 2200a/2200b or the product guides 2310a/2310b could feed other equipment for further positioning the round/patty products, e.g., in an overlapping "shingle"-style arrangement. As an example, the lateral transfer conveyors 2200a/2200b (or more preferably the product guides 2310a/2310b) could provide products to a transfer (conveyor) belt which feeds the products forwardly onto packaging on the packaging line conveyor 2400, but also shifts products laterally while doing so. This can be done, for example, by pivotally mounting the infeed end of the transfer belt so that the belt's discharge end may be laterally positioned as desired (e.g., by a linear actuator) above the packaging line conveyor 2400. Side guides would be provided at opposing sides of the transfer belt to carefully constrain and direct the path of travel of the products atop the transfer belt. As an alternative, the transfer belt could have its infeed and discharge ends at fixed location, and opposing side guides spaced slightly above the belt may be moved from side to side above the belt so that products riding on the transfer belt between the guides are laterally positioned as desired. By controlling the speed (and lateral positioning) of the transfer belt versus the speed of the packaging line conveyor 2400, product stacking, shingling, and other effects can be obtained.

It is emphasized that the conveyor systems 1000 and 2000 are merely exemplary, and conveyor systems in accordance with the invention (as defined in the claims below) may take many forms that vary from those of the exemplary conveyor systems 1000 and 2000. The invention is not intended to be limited to the exemplary versions of the invention described above, but rather is intended to be limited only by the claims set out below. Thus, the invention encompasses all different versions that fall literally or equivalently within the scope of these claims.

What is claimed is:

1. A conveyor system including:
   a. a lateral transfer conveyor, the lateral transfer conveyor having:
      (1) a continuous lateral transfer belt with:
         (a) opposing upper and lower lateral transfer belt lengths with flights protruding therefrom,
         (b) valleys defined between the flights, the valleys having valley lengths extending between a lateral transfer conveyor lengthwise input end and a lateral transfer conveyor lengthwise output end,
         (2) a stop situated along a portion of the lateral transfer conveyor lengthwise output end at the upper lateral transfer belt length,
   b. a product loading conveyor having continuous product loading belts which collectively encircle a product loading area, each product loading belt having opposing upper and lower product loading belt lengths, the lower product loading belt lengths being adjacently spaced in a parallel array,
   wherein:
   A. the lateral transfer belt extends within the product loading area;
   B. the lateral transfer belt is rotatable to move the flights in a direction oriented laterally with respect to the valley lengths;
   C. at least a subset of the valleys defined along the upper lateral transfer belt length are unobstructed at the lateral transfer conveyor lengthwise input end, whereby products may be received into respective valleys of the subset from the lateral transfer conveyor lengthwise input end;
   D. the stop obstructs the valleys at the lateral transfer conveyor lengthwise output end, whereby products in the valleys are deterred from exiting the lateral transfer conveyor lengthwise output end.

2. The conveyor system of claim 1 wherein the valley lengths of the lateral transfer belt are angled downwardly toward the lower product loading belt lengths, whereby products falling from the valleys each fall toward the lower product loading belt lengths.

3. The conveyor system of claim 1 wherein the valley lengths of the lateral transfer belt are oriented in planes parallel to the lower product loading belt lengths.

4. The conveyor system of claim 1 wherein one or more of the product loading belts have an elliptical cross-section.

5. The conveyor system of claim 1 wherein the lateral transfer conveyor is configured to:
   a. rotate the lateral transfer belt, and
   b. occasionally halt rotation such that a subset of the valleys has each valley therein aligned between a pair of lower product loading belt lengths, whereby products falling from the valleys each land between a pair of the lower product loading belt lengths.

6. The conveyor system of claim 1 further including a product guide:
   a. situated between the lateral transfer conveyor and the product loading conveyor,
   b. having a chute defined therein, the chute being oriented to:
      (1) receive a product from one of the valleys of the lateral transfer belt, and
      (2) direct the product onto a pair of the lower product loading belt lengths.

7. The conveyor system of claim 6 further including a chute gate situated within or adjacent the chute, the chute gate being movable to selectively obstruct or clear the chute, and thereby selectively block or pass the product's passage through the chute.

8. The conveyor system of claim 1 wherein the product loading conveyor further includes a stop gate within the product loading area, the stop gate being movable between:
   a. a lower stop gate position situated on or closely adjacent to the lower product loading belt lengths, and
   b. an upper stop gate position spaced further from the lower product loading belt lengths than the lower stop gate position,
   whereby the stop gate, when in the lower stop gate position, restrains products
   A. riding on the lower product loading belt lengths, and
   B. resting against the stop gate,
   from moving with the lower product loading belt lengths.

9. The conveyor system of claim 1 wherein the product loading conveyor further includes a product pusher within the product loading area, the product pusher having a lower pusher surface movable toward the lower product loading belt lengths, whereby products which each ride between a pair of lower product loading belt lengths may be urged by the lower pusher surface through the lower product loading belt lengths to fall therefrom.

10. A conveyor system including:
   a. a lateral transfer conveyor, the lateral transfer conveyor having:
      (1) a continuous lateral transfer belt with:
         (a) opposing upper and lower lateral transfer belt lengths with flights protruding therefrom,
         (b) valleys defined between the flights, the valleys having valley lengths extending between a lateral transfer conveyor lengthwise input end and a lateral transfer conveyor lengthwise output end, wherein the lateral transfer belt is rotatable to move the flights in a direction oriented laterally with respect to the valley lengths,
      (2) a stop situated along a portion of the lateral transfer conveyor lengthwise output end at the upper lateral transfer belt length,
   b. a product distribution conveyor having:
      (1) a product travel path extending between a product distribution conveyor lengthwise input end and a product distribution conveyor output end,
      (2) dividers spaced laterally across the product travel path, the dividers extending between the product distribution conveyor lengthwise input end and the product distribution conveyor output end,
      (3) discrete product travel lanes arrayed laterally across the product travel path of the product distribution conveyor, each product travel lane being situated between adjacent dividers;
   wherein:
   A. the lateral transfer conveyor lengthwise input end is situated adjacent the product distribution conveyor output end;
   B. at least a subset of the valleys defined along the upper lateral transfer belt length are unobstructed at the lateral transfer conveyor lengthwise input end, whereby products may be received into respective valleys of the subset from the lateral transfer conveyor lengthwise input end;
   C. the lateral transfer conveyor is configured to:
      i. move the lateral transfer belt in a direction lateral to the product travel path of the product distribution conveyor, and
      ii. halt the lateral transfer belt such that a subset of the valleys has each valley therein situated in alignment with an adjacent product travel lane, whereby products in the product travel lanes may be received within the valleys of the subset;
   D. the stop obstructs the valleys at the lateral transfer conveyor lengthwise output end, whereby products in the valleys are deterred from exiting the lateral transfer conveyor lengthwise output end.

11. The conveyor system of claim 10 wherein:
   a. each valley within the subset of valleys has a received product therein, and
   b. the lateral transfer conveyor lengthwise input ends of the subset of valleys are situated below the product distribution conveyor output end,
   whereby subsequent products received from the product travel lanes are received atop already-received products situated within the subset of valleys.

12. The conveyor system of claim 10 wherein the lateral transfer conveyor further includes a stationary gate situated closely above the flights of the lateral transfer belt, whereby a subsequent product situated atop an already-received product within a valley will encounter the gate, and be swept from the lateral transfer belt, as the lateral transfer belt moves.

13. The conveyor system of claim 10 further including a recycling conveyor situated beneath the lateral transfer conveyor, the recycling conveyor being configured to receive products falling from the lateral transfer conveyor.

14. A conveyor system including a lateral transfer conveyor, the lateral transfer conveyor having:
   a. a continuous lateral transfer belt with:
      (1) opposing upper and lower lateral transfer belt lengths with flights protruding therefrom,
      (2) valleys defined between the flights, the valleys having valley lengths extending between a lateral transfer conveyor lengthwise input end and a lateral transfer conveyor lengthwise output end,
   b. a stop situated along a portion of the lateral transfer conveyor lengthwise output end at the upper lateral transfer belt length,
   wherein:
   A. the lateral transfer belt is rotatable to move the flights in a direction oriented laterally with respect to the valley lengths;
   B. at least a subset of the valleys defined along the upper lateral transfer belt length are unobstructed at the lateral transfer conveyor lengthwise input end, whereby products may be received into respective valleys of the subset from the lateral transfer conveyor lengthwise input end;
   C. the stop obstructs the valleys at the lateral transfer conveyor lengthwise output end, whereby products in the valleys are deterred from exiting the lateral transfer conveyor lengthwise output end; and
   D. the lateral transfer conveyor lengthwise output end is situated lower than the lateral transfer conveyor lengthwise input end, whereby products received within the valleys of the subset from the lateral transfer conveyor lengthwise input end tend to settle toward the lateral transfer conveyor lengthwise output end and against the stop.

15. A conveyor system including:
   a. a product loading conveyor having continuous product loading belts which collectively encircle a product loading area, each product loading belt having opposing upper and lower product loading belt lengths, the lower product loading belt lengths being adjacently spaced in a parallel array;
   b. a lateral transfer conveyor extending within the product loading area, the lateral transfer conveyor including:
      (1) a lateral transfer belt having:
         (a) flights protruding therefrom, and
         (b) valleys defined between the flights, the valleys extending between a lateral transfer conveyor lengthwise input end and a lateral transfer conveyor lengthwise output end,
      (2) a stop situated at the lateral transfer conveyor lengthwise output end outside the product loading area, the stop obstructing the valleys at the lateral transfer conveyor lengthwise output end whereby products in the valleys are deterred from exiting the lateral transfer conveyor lengthwise output end,
   wherein the lateral transfer conveyor is configured to:

A. move the lateral transfer belt in a direction lateral to the lower product loading belt lengths, and
B. stop the lateral transfer belt such that a subset of the valleys has each valley therein situated in alignment between a pair of lower product loading belt lengths, whereby products falling from the valleys each land between a pair of the lower product loading belt lengths.

16. A conveyor system including:
a. a product distribution conveyor having a product travel path along which products travel from a product distribution conveyor lengthwise input end to a product distribution conveyor output end, wherein the products are distributed in discrete product travel lanes arrayed laterally across the product travel path of the product distribution conveyor;
b. a lateral transfer conveyor situated adjacent the product distribution conveyor output end, the lateral transfer conveyor including:
   (1) a lateral transfer belt having:
      (a) flights protruding therefrom, and
      (b) valleys defined between the flights, the valleys extending between a lateral transfer conveyor lengthwise input end and a lateral transfer conveyor lengthwise output end;
   (2) a stop situated at the lateral transfer conveyor lengthwise output end, the stop obstructing the valleys at the lateral transfer conveyor lengthwise output end whereby products in the valleys are deterred from exiting the lateral transfer conveyor lengthwise output end;
wherein the lateral transfer conveyor is configured to:
A. move the lateral transfer belt in a direction lateral to the product travel path of the product distribution conveyor, and
B. stop the lateral transfer belt such that a subset of the valleys has each valley therein situated in alignment with an adjacent product travel lane, whereby products in the product travel lanes may be received within the valleys of the subset.

17. The conveyor system of claim 16 wherein the lateral transfer conveyor lengthwise output end is situated lower than the lateral transfer conveyor lengthwise input end, whereby products received within the valleys of the subset tend to settle toward the lateral transfer conveyor lengthwise output end and against the stop.

18. The conveyor system of claim 16 wherein:
a. each valley within the subset of valleys has a received product therein, and
b. the lateral transfer conveyor lengthwise input ends of the subset of valleys are situated below the product distribution conveyor output end,
whereby subsequent products received from the product travel lanes are received atop already-received products situated within the subset of valleys.

19. The conveyor system of claim 16 wherein the lateral transfer conveyor further includes a stationary gate situated closely above the flights of the lateral transfer belt, whereby a subsequent product situated atop an already-received product within a valley will encounter the gate, and be swept from the lateral transfer belt, as the lateral transfer belt moves.

20. The conveyor system of claim 16 further including a recycling conveyor situated beneath the lateral transfer conveyor, the recycling conveyor being configured to receive products falling from the lateral transfer conveyor.

* * * * *